(12) United States Patent
Battaiola Kreling et al.

(10) Patent No.: US 10,338,824 B2
(45) Date of Patent: Jul. 2, 2019

(54) BANDWIDTH MANAGEMENT OF MEMORY THROUGH CONTAINERS

(71) Applicant: INTERNATIONAL BUSINESS MACHINES CORPORATION, Armonk, NY (US)

(72) Inventors: Daniel Battaiola Kreling, Sao Paulo (BR); Rafael Camarda Silva Folco, Sao Paulo (BR); Breno H. Leitao, Araraquara (BR); Mauro Sergio Martins Rodrigues, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 15/807,758

(22) Filed: Nov. 9, 2017

(65) Prior Publication Data

US 2019/0138223 A1    May 9, 2019

(51) Int. Cl.
*G06F 3/06*    (2006.01)

(52) U.S. Cl.
CPC .......... *G06F 3/0613* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,814,491 B1 | 10/2010 | Chen et al. | |
| 8,392,564 B1 | 3/2013 | Czajkowski et al. | |
| 9,348,622 B2 | 5/2016 | Emelyanov et al. | |
| 2007/0185938 A1* | 8/2007 | Prahlad | G06F 16/2365 |
| 2009/0178045 A1 | 7/2009 | Gupta et al. | |

(Continued)

OTHER PUBLICATIONS

Singh et al., "Containers: Challenges with the memory resource controller and its performance", Proceedings of the Linux Symposium, vol. Two, Jun. 27-30, 2007, Ottawa, Ontario Canada, Ideahttps://www.kernel.org/doc/ols/2007/ols2007v2-pages-209-222.pdf., pp. 209-222.

(Continued)

*Primary Examiner* — Daniel D Tsui
(74) *Attorney, Agent, or Firm* — Tihon Poltavets

(57) ABSTRACT

Embodiments of the present invention disclose a method, computer program product, and system for managing memory bandwidth usage in software containers. Software container properties are received from a software container engine. In response to detecting the execution of one or more software containers by the software container engine, a monitoring layer is generated. At periodic time intervals, the generated monitoring layer monitors a memory bandwidth use value associated with each of the executed software containers. For each periodic time interval, an average memory use value is calculated, associated with each executed software container. In response to the calculated average memory use value being above a threshold associated with a monitored software container of the executed containers, the monitored software container is suspended for a suspend time duration. The suspended monitored software container is reactivated based on the suspend time duration expiring.

20 Claims, 7 Drawing Sheets

(56) References Cited

U.S. PATENT DOCUMENTS

2017/0180346 A1* 6/2017 Suarez ............... G06F 9/45558

OTHER PUBLICATIONS

Felter et al., "IBM Research Report an Updated Performance Comparison of Virtual Machines and Linux Containers", RC25482 (AUS1407-001) Jul. 21, 2014, Computer Science, http://domino.research.ibm.com/library/cyberdig.nsf/papers/0929052195DD819C85257D2300681E7B/$File/rc25482.pdf, 12 pages.

Moscibroda et al., "Memory Performance Attacks: Denial of Memory Service in Multi-Core Systems", Published in USENIX Security 2007: 16th USENIX Security Smposium, Boston, Massachusetts, USA, pp. 1-18.

Goldmann, "Resource management in Docker", BLOG, Sep. 11, 2014, https://goldmann.pl/blog/2014/09/11/resourcemanagementindocker/#_limiting_read_write_speed, pp. 1-19.

Mell et al., "The NIST Definition of Cloud Computing", Recommendations of the National Institute of Standards and Technology, Special Publication 800-145, Sep. 2011, 7 pages.

Nguyen, "Introduction to Memory Bandwidth Monitoring in the Intel® Xeon® Processor E5 v4 Family", Updated Feb. 11, 2016, Developer Zone, https://software.intel.com/en-us/articles/introduction-to-memory-bandwidth-monitoring, 7 pages.

Netto et al., "Evaluate performance for Linux on POWER", Analyze performance using Linix tools, Published on Jun. 12, 2012, developerWorks®, 19 pages.

Prashanth, "Control Groups", IIT-B, Jun. 7, 2017, 10 pages.

* cited by examiner

BANDWIDTH MANAGEMENT OF MEMORY THROUGH CONTAINERS

BACKGROUND

The present invention relates generally to the field of computer resource utilization, and more particularly to the mitigation of bandwidth limitations of computer memory through container modification.

Performance monitoring units are hardware devices built inside a computer processor to measure various performance parameters of the processor. Performance monitoring units may measure computer performance parameters, for example, memory bandwidth use, instruction cycles, cache hits, cache misses, branch misses and many other parameters. It should be appreciated by those in the art that by monitoring performance through a performance monitoring unit there is very limited computer resource impact as the monitoring is accomplished through hardware. Therefore, performance monitoring units may collect data automatically and may not significantly degrade performance.

A software container, or container image, is a lightweight, stand-alone, executable package of a piece of software that includes everything needed to run, for example, code, runtime, system tools, system libraries, etc. Containerized software will always run the same, regardless of the operating system environment. Containers isolate software from its surroundings, for example, differences between development and staging environments, which may help reduce conflicts between instances of different running software on the same infrastructure.

SUMMARY

Embodiments of the present invention disclose a method, computer program product, and system for managing memory bandwidth usage in software containers. Software container properties are received from a software container engine, the software container properties include at least a max memory bandwidth use value. In response to detecting the execution of one or more software containers by the software container engine, a monitoring layer is generated. At periodic time intervals, the generated monitoring layer monitors a memory bandwidth use value associated with each of the executed software containers. For each periodic time interval, an average memory use value is calculated, associated with each executed software container. In response to the calculated average memory use value being above a threshold associated with a monitored software container of the executed containers, the monitored software container is suspended for a suspend time duration, wherein the memory bandwidth use value associated with the suspended software container does not increase. The suspended monitored software container is reactivated based on the suspend time duration expiring.

DETAILED DESCRIPTION

Figure 1:
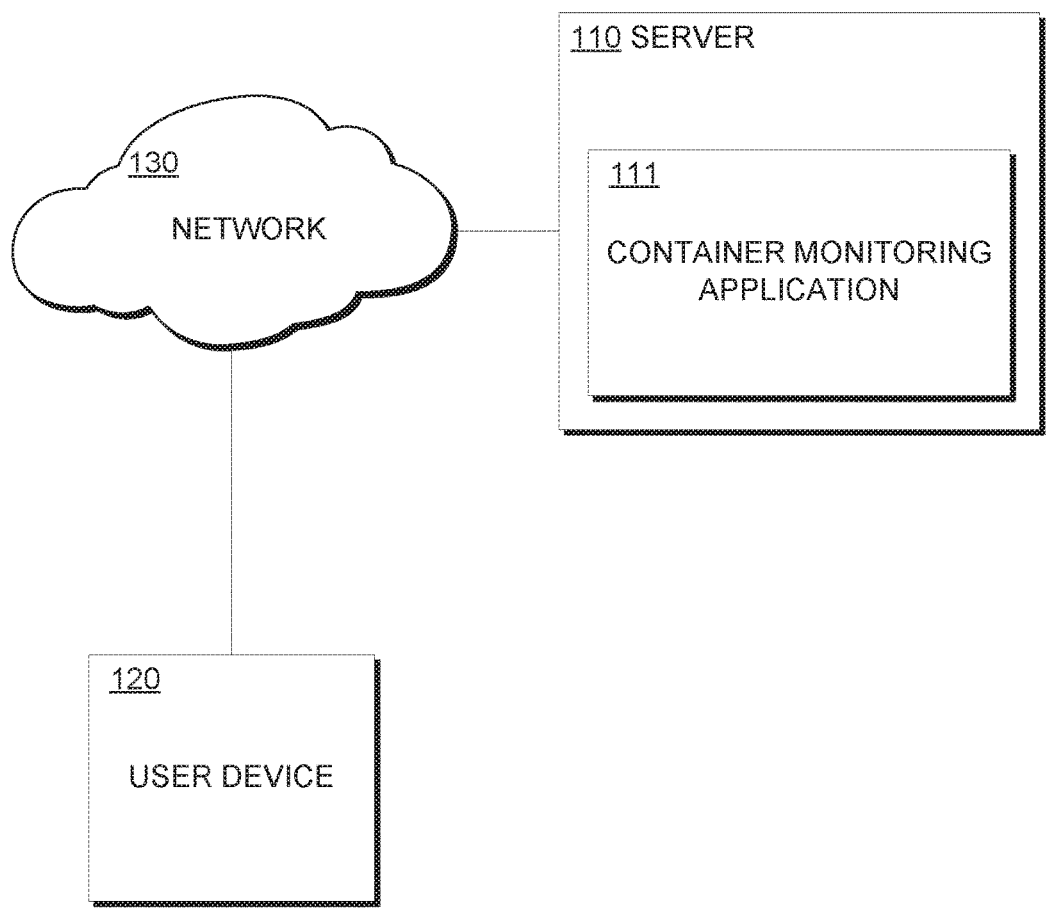
FIG. 1 is a functional block diagram illustrating a distributed data processing environment, in accordance with an embodiment of the present invention.

Embodiments of the present invention relate to the field of computing, and more particularly to the mitigation of bandwidth limitations of computer memory through container modification. The following described exemplary embodiments provide a system, method, and program product to, among other things, generate a container monitor layer in order to calculate memory bandwidth use of all executed containers within a system and enabling the monitor layer to suspend containers that cross a memory use threshold. Therefore, the present embodiment has the capacity to improve the technical field of network management and performance monitoring unit efficiency by dynamically monitoring memory bandwidth use of containers and preventing containers from utilizing a disproportionate amount of memory bandwidth, which may impact the performance of other containers or the overall system.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Software containers are abstractions at the application layer that package code and dependencies together. Multiple containers can run on the same computer system and share one operating system kernel. Each software container may run as an isolated process. While software containers take up less space than other solutions, such as virtual machines, the memory bandwidth a container consumes may reach a point where the performance of other containers or the host system, or server, is negatively impacted. Therefore, it may be advantageous to monitor the memory bandwidth use of active containers on a server, and prevent containers from utilizing an amount of memory bandwidth that would impact other containers or systems on the server.

Performance monitoring units may be accessed to monitor memory bandwidth use of active containers, however, performance monitoring units cannot generate, execute, suspend, or reactivate software running on a server. It may be advantageous to have an application that can interact with a performance monitoring unit in order to manage software on the server, for example, software containers, in order to increase the efficiency of the computer system running the software containers.

FIG. 1 is a functional block diagram illustrating a distributed data processing environment, generally designated 100, in accordance with one embodiment of the present invention. Distributed data processing environment 100 includes server 110 and user device 120, all interconnected over network 130.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between server 110 and user device 120.

Server 110 and user device 120 may be a laptop computer, tablet computer, netbook computer, personal computer (PC), a desktop computer, a smart phone, or any programmable electronic device capable of communicating with various components and devices distributed data processing environment 100. In various embodiments, server 110 may be a separate server or series of servers, a database, or other data storage, internal or external to user device 120. Server 110 and user device 120 may include internal and external hardware components, as depicted and described in further detail with respect to FIG. 5.

In various embodiments, user device 120 may act generally to host an application capable of display, in a graphical user interface, or communicate over a network, for example network 130, via a web browser. In various embodiments of the invention, user device 120 may communicate with other computing devices within distributed data processing environment 100. User device 120 may communicate user input, or requests, over a network, for example, a request to monitor software containers and an associated user input selection representing a predetermined maximum memory bandwidth use value for software containers running on a server, for example, server 110.

In various embodiments, server 110 includes container monitoring application 111, as described in more detail below with reference to FIG. 2. Container monitoring application 111 may act generally to receive requests for software container monitoring from a device, for example user device 120, via server 110, monitor memory bandwidth use of active containers on a server associated with the request, for example server 110, and suspend containers that exceed an average memory bandwidth use maximum value associated with the request.

In an alternative embodiment of the invention, no maximum memory bandwidth use value may be associated with the received request. Container monitoring application 111 may receive, or monitor and store in a datastore, historical performance data associated with a target computer system associated with the request. Container monitoring application 111 may calculate an optimized maximum memory bandwidth use value based on the received historical data. For example, if the historical data shows a degradation of performance when a single container exceeds bandwidth of 30 MB/s, container monitoring application 111 may calculate a maximum memory bandwidth use value of 25 MB/s based on the received historical data.

Container monitoring application 111 may generate a new container management layer, or monitoring layer, to manage and control the memory bandwidth use of software containers through an algorithm or predetermined policy associated with the received request. It may be advantageous to monitor the software containers from a new software layer so that the monitoring layer is isolated from the containers. For example, a software container may be consuming excessive memory bandwidth due to malicious software exploiting the memory bus through excessive use. Monitoring from an isolated software layer may allow greater control and a more efficient response to excessive use that would not also be affected by the malicious software infection of a particular container of system.

In various embodiments, container monitoring application 111 may communicate with hardware, for example a performance monitoring unit or performance counter. Container monitoring application 111 may receive memory bandwidth use data at regular intervals for a unit of time, for example, every second. Container monitoring application 111 may calculate the average memory bandwidth use for every software container. If the calculated average memory bandwidth use for a certain container exceeds a calculated or predetermined threshold, container monitoring application 111 may suspend, or freeze, the software container such that it no longer has access to the memory bus and becomes read only. For example, control groups within the operating system may isolate a software container using XML commands (IsFrozen="true").

In various embodiments, during a time interval subsequent to a software container being suspended the average memory bandwidth use associated with the suspended software container will decrease as the memory bandwidth use is zero for that time interval. Container monitoring application 111 may calculate the memory bandwidth use value for the suspended software container and, if the memory bandwidth use value is below a threshold, container monitoring application 111 may reactivate the suspended software container. In various embodiments, container monitoring application 111 may calculate the number of time intervals needed for the average memory bandwidth use value to be equal to or below a threshold and communicate instructions to suspend the software container for the calculated number or time intervals. For example, container monitoring application 111 may calculate the number of time intervals needed for the average memory bandwidth use value to be equal to or below a threshold using the following formula:

$$T=(U_{ave}-U_{max})/U_{max} \qquad \text{equation 1}$$

where T represents the number of time intervals the software container is suspended rounded up to the nearest integer, $U_{ave}$ represents the calculated average memory bandwidth use of the software container, and $U_{max}$ represents the threshold associated with the monitor request. For example, if the calculated average memory bandwidth use of the software container is 30 MB/s and the request threshold is 8 MB/s then T would be calculated as follows:

$$T=(U_{ave}-U_{max})/U_{max}$$

$$T=(30 \text{ MB/s}-8 \text{ MB/s})/8 \text{ MB/s}$$

$$T=(22 \text{ MB/s})/8 \text{ MB/s}$$

$$T=2.75$$

$$T=3$$

In various embodiments, container monitoring application 111 may continuously and dynamically monitor, suspend, and reactivate software containers while any software containers are active. In various embodiments, container monitoring application 111 may continuously and dynamically monitor, suspend, and reactivate software containers for a predetermined number of time intervals, for example, a time duration associated with the request for software container monitoring or a time period associated with peak bandwidth use, that may or may not be based on historical performance data.

Figure 2:
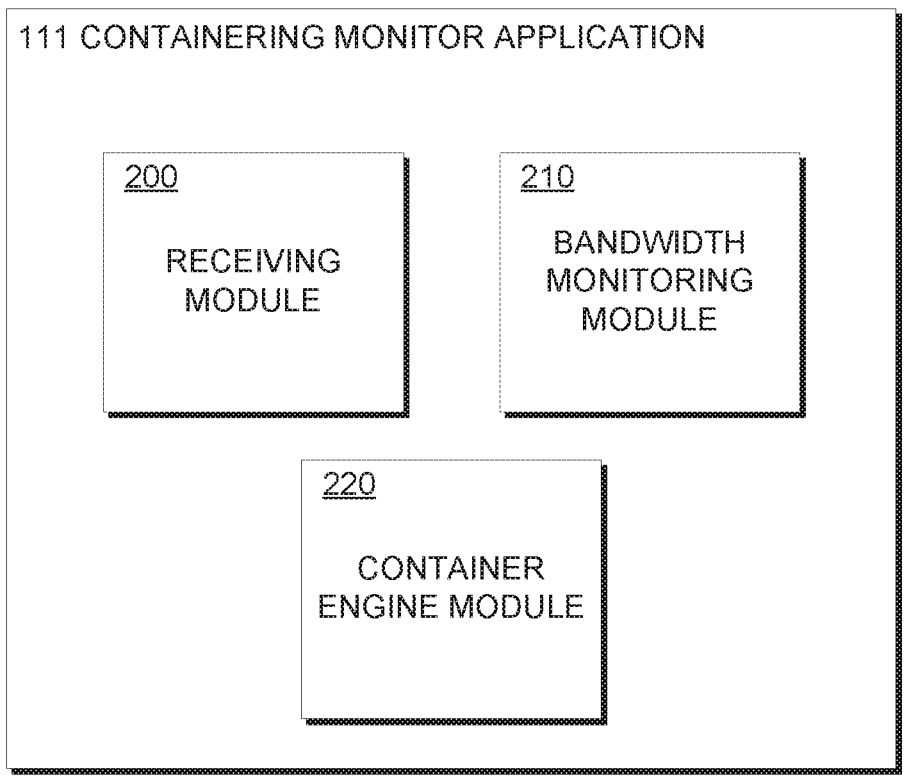
FIG. 2 is a functional block diagram illustrating the components of an application within the distributed data processing environment, in accordance with an embodiment of the present invention.

FIG. 2 is a functional block diagram illustrating the components of container monitoring application 111 on server 110, within the distributed data processing environment 100, in accordance with an embodiment of the present invention. Container monitoring application 111 includes receiving module 200, bandwidth monitoring module 210, and container engine module 220.

Referring to FIGS. 1 and 2, receiving module 200 may receive a request to monitor software containers, from a user device, with an associated maximum memory bandwidth use value. In various embodiments, the request may identify containers to be monitored. In further additional embodiments, the request may contain an associated time frame to monitor software containers, or a command to monitor all active software containers associated with a server, for example server 110. Receiving module 200 may query a performance monitoring unit for performance data associated with the software containers to be monitored, for example, memory bandwidth use per time interval. Receiving module 200 may communicate request data, associated maximum memory bandwidth use value, and queried performance data to bandwidth monitoring module 210.

Bandwidth monitoring module 210 may receive software container associated with a monitoring request, a maximum memory bandwidth use value, and queried performance data from receiving module 200. Bandwidth monitoring module 210 may calculate the average memory bandwidth use for each monitored container based on the queried performance data. Bandwidth monitoring module 210 may communicate the calculated average memory bandwidth use values to container engine module 220.

Container engine module 220 may receive calculated average memory bandwidth use values for each active container from bandwidth monitoring module 210. If an average memory use value for a monitored container exceeds a threshold associated with the maximum memory bandwidth use value, container engine module 220 may suspend the software container associated with the average above the threshold. Container engine module 220 may calculate a time duration needed for the average memory bandwidth use value of the suspended software container to become equal to or below the threshold. After the calculated time duration, or time duration expiration, container engine module 220 may reactivate the suspended software container. In various embodiments, container engine module 220 may calculate the average memory bandwidth use value of the suspended software container for every time interval and reactivate the suspended software container at the time interval following the time interval were the calculated average memory bandwidth use value of the suspended software container is equal to or below the threshold.

In various embodiments, bandwidth monitoring module 210 may generate a software layer, for example, monitoring layer 330 (FIG. 3) that performs the functions of bandwidth monitoring module 210 described above. In various embodiments, the monitoring layer 330 may receive information from a performance monitoring unit in a form of a software container parameter when a software container is generated, for example '-memory-bandwidth=', where '-memory-bandwidth=' represents the value equal to the average amount of memory bandwidth the software container will be allowed to use.

Figure 3:
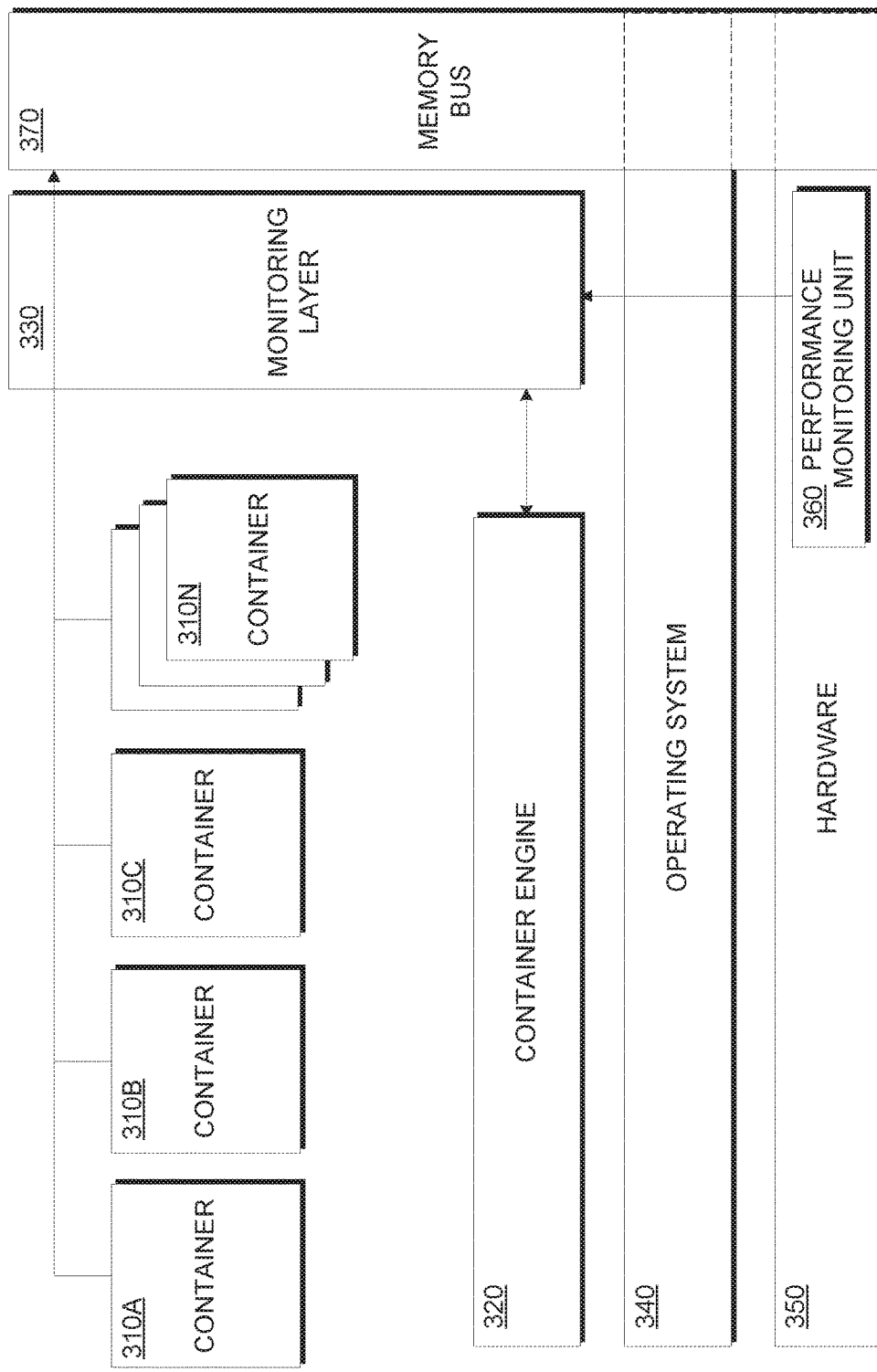
FIG. 3 is a functional block diagram illustrating the container architecture of an application within a server, in accordance with an embodiment of the present invention.

FIG. 3 is a functional block diagram illustrating the software container architecture of container monitoring application 111 within a server 110, in accordance with an embodiment of the present invention.

Containers 310A, 310B, 310C, and 310N represent various active software containers within a server environment, for example, server 110, running on operating system 340. Containers 310A-310N, operating system 340, and hardware 350 all communicate and use resources from memory bus 370. Container engine 320 is capable of suspending and reactivating software containers, for example, containers 310A-N and receiving instructions from monitoring layer 330 to suspend and reactivate software containers. Monitoring layer 330 is generated by container engine module 220 in order to receive date performance data from performance monitoring unit 360 on hardware layer 350, and communicate instructions to container engine 320.

Figure 4:
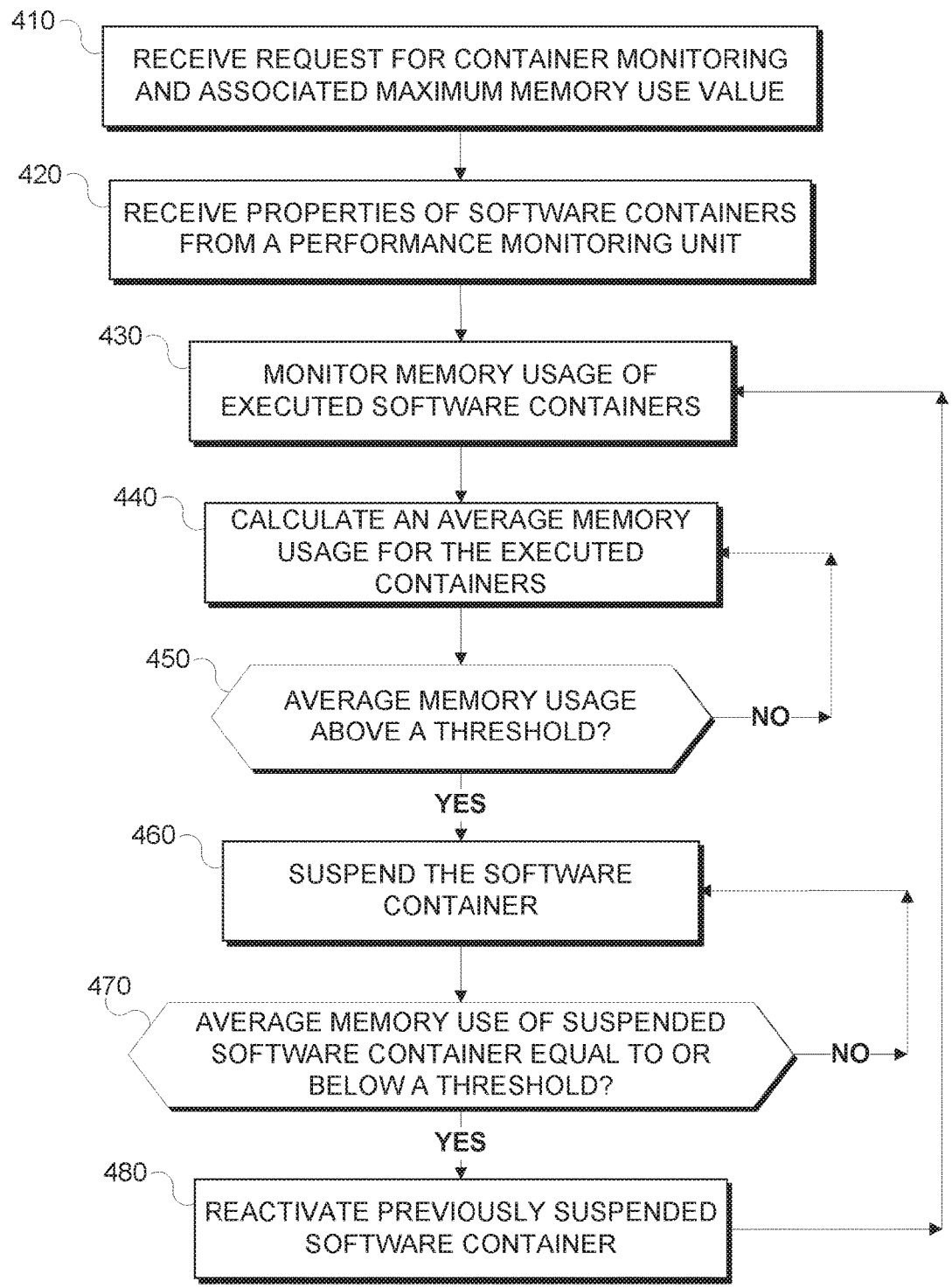
FIG. 4 is a flowchart depicting operational steps of an application, on a server computer within the data processing environment of FIG. 1, in accordance with an embodiment of the present invention.

FIG. 4 is a flowchart depicting operational steps of container monitoring application 111, on server 110 within the data processing environment 100 of FIG. 1, in accordance with an embodiment of the present invention.

Referring to FIGS. 1-4, receiving module 200 receives a request to monitor one or more software containers executed on a computer system (block 410). For example, receiving module 200 receives a request form user device 120, to monitor Container 310A and Container 310B, executed on server 110. Receiving module 200 receives a maximum memory bandwidth use value associated with the request (block 420). For example, the received request from user device 120 has an associated maximum memory bandwidth use value of 10 MB/s, representing the maximum memory bandwidth Containers 310A and 310B can access on average, based on the request. Receiving module 200 communicated the request and associated container identification and maximum memory bandwidth use value to bandwidth monitoring module 210.

Bandwidth monitoring module 210 monitors the memory use of executed software containers associated with the request (block 430). Bandwidth monitoring module 210 may query hardware 350 for the memory bandwidth use. For example, Bandwidth monitoring module 210 queries a performance monitoring unit 360 for the memory bandwidth use of Containers 310A and 310B.

Bandwidth monitoring module 210 calculates the average memory bandwidth use of the monitored containers based on the received memory bandwidth use data (block 440) and communicates the average memory bandwidth use values associated with executed containers to container engine module 220. For example, bandwidth monitoring module 210 receives memory bandwidth use of 10 MB/s and 5 MB/s for Container 310A and Container 310B respectively for time interval 1 from performance monitoring unit 360. Bandwidth monitoring module 210 receives memory bandwidth use of 30 MB/s and 5 MB/s for Container 310A and Container 310B respectively for time interval 2 from performance monitoring unit 360. Bandwidth monitoring module 210 calculates the average memory bandwidth use of 20 MB/s and 5 MB/s for Container 310A and Container 310B respectively and communicates the average memory bandwidth use values to container engine module 220.

Container engine module 220 receives the calculated average memory bandwidth use values for the monitored containers. If the received average memory bandwidth use values are above a threshold (block 450 "YES" branch) container engine module 220 suspends the container (block 460). If the received average memory bandwidth use values are equal to or below a threshold (block 450 "NO" branch) container engine module 220 takes no action and continues to receive average memory bandwidth use from bandwidth monitoring module 210. For example, container engine module 220 receives the average memory bandwidth use value for Container 310A as 20 MB/s and since above the threshold associated with the monitor request of 10 MB/s container engine module 220 suspends Container 310A. Container 310B has an average memory bandwidth use value of 5 MB/s which is below the 10 MB/s threshold and container engine module 220 continues to monitor the memory bandwidth use.

Container engine module 220 maintains the suspended container to prevent further memory use. If the average memory bandwidth use value of the suspended container is equal to or below the threshold (block 470 "YES" branch) container engine module 220 reactivates the suspended container (block 480). If the average memory bandwidth use value of the suspended container is still above the threshold (block 470 "NO" branch) the container remains suspended. For example, for time interval 3 the average memory bandwidth use value for Container 310A is 13.333 MB/s and container engine module 220 maintains Container 310A as suspended. For time interval 4, the average memory bandwidth use value for Container 310A is 10 MB/s and container engine module 220 reactivates Container 310A.

Figure 6:
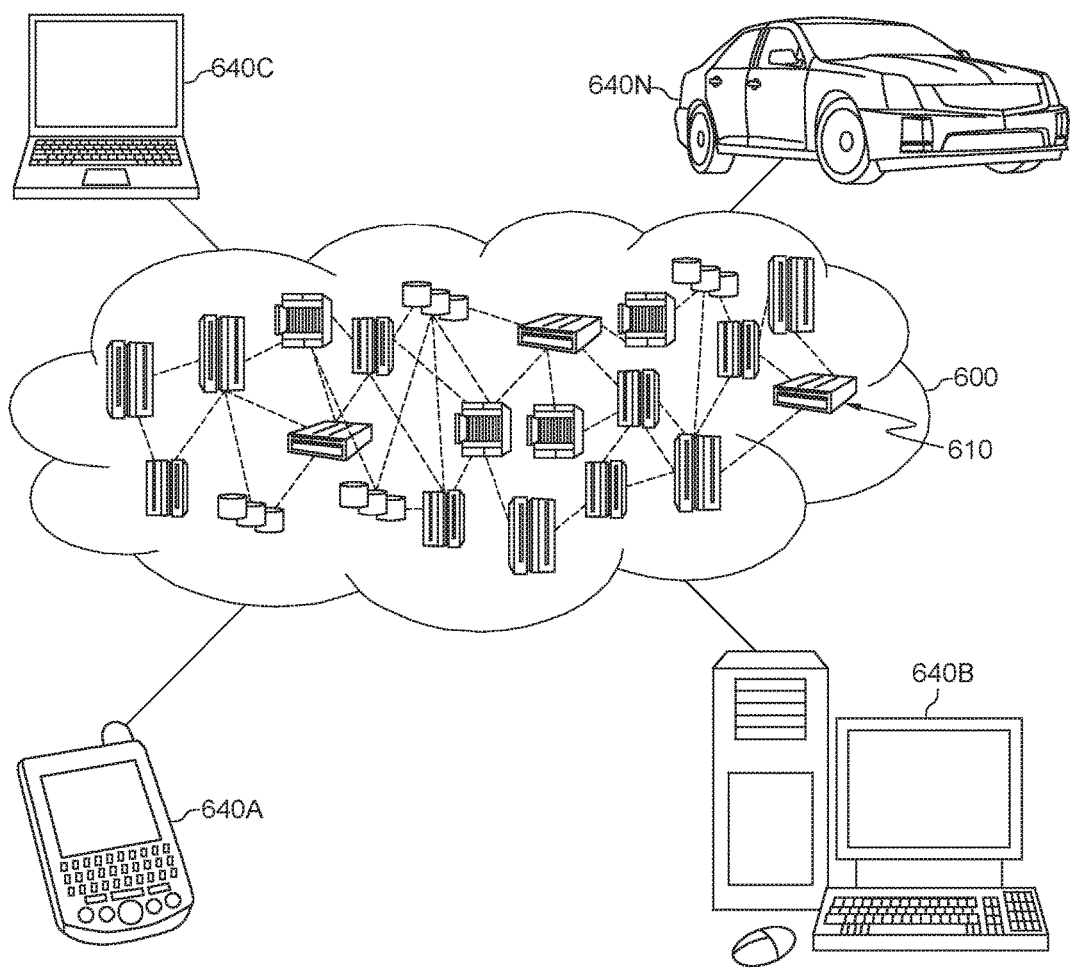
FIG. 6 depicts an illustrative cloud computing environment, in accordance with an embodiment of the present invention.

In various embodiments, the application may run within a cloud computing environment, described in further detail in reference to FIG. 6. For example, container monitoring application 111 may monitor software containers in a cloud computing environment and provide real time performance monitoring and suspend/reactivate containers within the cloud computing environment as described above. In various embodiments, container monitoring application 111 may receive geographical data from a device, for example, user device 120 via a global positioning system within user device 120 (not shown). Container monitoring application 111 may modify the memory use threshold based on the received geographical data. For example, if container monitoring application 111 receives a memory use threshold from user device 120, however the geographical location of user device 120 is such that performance is impacted based on the quality of the network in that geographical location, container monitoring application 111 may decrease the memory use threshold in order to mitigate a network already of a lower bandwidth capability than surrounding geographical locations. In various embodiments, container monitoring application 111 may communicate a confirmation prompt to a user, for example, user device 120, before modifying the memory use threshold based on geographical data.

Figure 5:
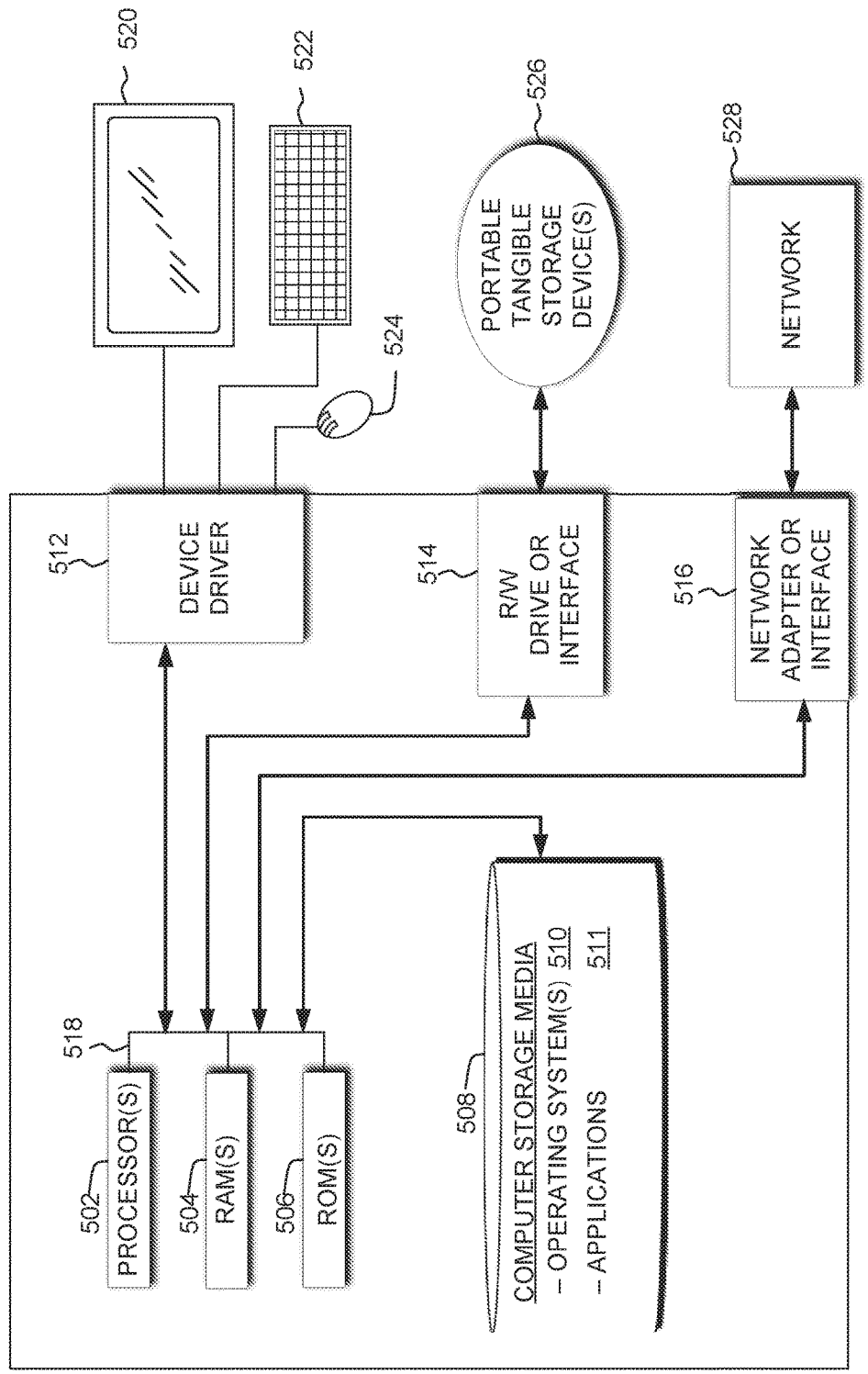
FIG. 5 depicts a block diagram of components of the server computer executing the ingestion application, in accordance with an embodiment of the present invention.

FIG. 5 depicts a block diagram of components of server 110 and user device 120 of distributed data processing environment 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Server 110 and user device 120 may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, container monitoring application 111, are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 and user device 120 may also include a R/W drive or interface 514 to read from and write to one or more portable computer readable storage media 526. Application programs 511 on server 110 and user device 120 may be stored on one or more of the portable computer readable storage media 526, read via the respective R/W drive or interface 514 and loaded into the respective computer readable storage media 508.

Server 110 and user device 120 may also include a network adapter or interface 516, such as a TCP/IP adapter card or wireless communication adapter (such as a 4G wireless communication adapter using OFDMA technology) for connection to a network 528. Application programs 511 on server 110 and user device 120 may be downloaded to the computing device from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Server 110 and user device 120 may also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

Referring now to FIG. 6, an illustrative cloud computing environment 600 is depicted. As shown, cloud computing environment 600 comprises one or more cloud computing nodes 610 with which local computing devices used by cloud consumers, such as, for example, personal digital assistant (PDA) or cellular telephone 640A, desktop computer 640B, laptop computer 640C, and/or automobile computer system 640N may communicate. Computing nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 640A-N shown in FIG. 6 are intended to be illustrative only and that computing nodes 610 and cloud computing environment 600 can communicate with any type of computerized device over any type of network and/or network addressable connection (e.g., using a web browser).

Figure 7:
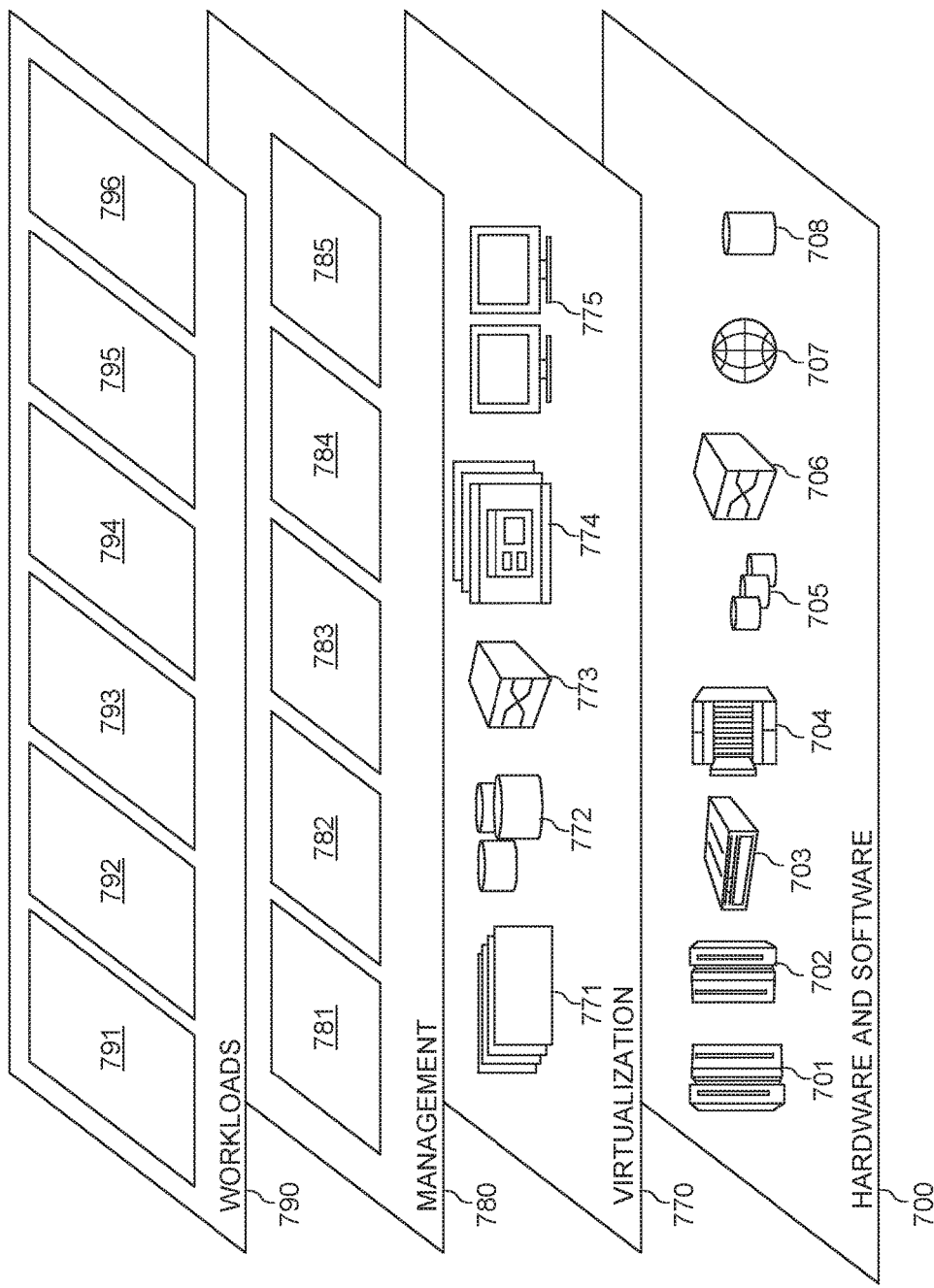
FIG. 7 depicts a functional block diagram illustrating the functional abstraction layers provided by a cloud computing environment, in accordance with an embodiment of the present invention.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 701; RISC (Reduced Instruction Set Computer) architecture based servers 702; servers 703; blade servers 704; storage devices 705; and networks and networking components 706. In some embodiments, software components include network application server software 707 and database software 708.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and container monitoring processing 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for managing memory bandwidth usage in containers, the method comprising:
    receiving software container properties from a software container engine, wherein the software container properties include at least a max memory bandwidth use value;
    in response to detecting execution of one or more software containers by the software container engine, generating a monitoring layer;
    at periodic time intervals, monitoring, by the generated monitoring layer, a memory bandwidth use value associated with each of the executed software containers;
    for each periodic time interval, calculating an average memory use value associated with each executed software container;
    in response to the calculated average memory use value being above a threshold associated with a monitored software container of the executed containers, suspending the monitored software container for a suspend time duration, wherein the memory bandwidth use value associated with the suspended software container does not increase; and
    reactivating the suspended monitored software container based on the suspend time duration expiring.

2. The computer-implemented method of claim 1, wherein software container properties further include: one or more memory bandwidth access permission settings.

3. The computer-implemented method of claim 1, further comprising:
    in response to the calculated average memory use value being equal to or below the threshold, calculating the average memory use value associated with each executed software container for a next time interval.

4. The computer-implemented method of claim 1, wherein suspending the software container is based on receiving a suspend command from an operating system kernel associated with a performance monitoring unit.

5. The computer-implemented method of claim 1, wherein the suspend time duration is equal to the calculated average memory use value minus the max memory bandwidth use value, divided by the max memory-bandwidth use value.

6. The computer-implemented method of claim 1, wherein the suspend time duration is an integer value rounded up to a nearest integer value.

7. The computer-implemented method of claim 1, wherein the software container properties are received via a performance monitoring unit.

8. A computer program product for managing memory bandwidth usage in containers, the computer program product comprising:
    one or more computer-readable storage media and program instructions stored on the one or more computer-readable storage media, the program instructions comprising:
    instructions to receive software container properties from a software container engine, wherein the software container properties include at least a max memory bandwidth use value;
    in response to instructions to detect execution of one or more software containers by the software container engine, instructions to generate a monitoring layer;

at periodic time intervals, instructions to monitor, by the generated monitoring layer, a memory bandwidth use value associated with each of the executed software containers;

for each periodic time interval, instructions to calculate an average memory use value associated with each executed software container;

in response to the calculated average memory use value being above a threshold associated with a monitored software container of the executed containers, instructions to suspend the monitored software container for a suspend time duration, wherein the memory bandwidth use value associated with the suspended software container does not increase; and instructions to reactivate the suspended monitored software container based on the suspend time duration expiring.

9. The computer program product of claim 8, wherein software container properties further include: one or more memory bandwidth access permission settings.

10. The computer program product of claim 8, further comprising:
in response to the calculated average memory use value being equal to or below the threshold, instructions to calculate the average memory use value associated with each executed software container for a next time interval.

11. The computer program product of claim 8, wherein instructions to suspend the software container is based on instructions to receive a suspend command from an operating system kernel associated with a performance monitoring unit.

12. The computer program product of claim 8, wherein the suspend time duration is equal to the calculated average memory use value minus the max memory bandwidth use value, divided by the max memory-bandwidth use value.

13. The computer program product of claim 12, wherein the suspend time duration is an integer value rounded up to a nearest integer value.

14. The computer program product of claim 8, wherein the software container properties are received via a performance monitoring unit.

15. A computer system for managing memory bandwidth usage in containers, the computer system comprising:
one or more computer processors;
one or more computer-readable storage media;
program instructions stored on the computer-readable storage media for execution by at least one of the one or more processors, the program instructions comprising:
instructions to receive software container properties from a software container engine, wherein the software container properties include at least a max memory bandwidth use value;
in response to instructions to detect execution of one or more software containers by the software container engine, instructions to generate a monitoring layer;
at periodic time intervals, instructions to monitor, by the generated monitoring layer, a memory bandwidth use value associated with each of the executed software containers;
for each periodic time interval, instructions to calculate an average memory use value associated with each executed software container;
in response to the calculated average memory use value being above a threshold associated with a monitored software container of the executed containers, instructions to suspend the monitored software container for a suspend time duration, wherein the memory bandwidth use value associated with the suspended software container does not increase; and
instructions to reactivate the suspended monitored software container based on the suspend time duration expiring.

16. The computer system of claim 15, wherein software container properties further include: one or more memory bandwidth access permission settings.

17. The computer system of claim 15, wherein instructions to suspend the software container is based on instructions to receive a suspend command from an operating system kernel associated with a performance monitoring unit.

18. The computer system of claim 15, wherein the suspend time duration is equal to the calculated average memory use value minus the max memory bandwidth use value, divided by the max memory-bandwidth use value.

19. The computer system of claim 18, wherein the suspend time duration is an integer value rounded up to a nearest integer value.

20. The computer system of claim 15, wherein the software container properties are received via a performance monitoring unit.

* * * * *